United States Patent
Kawamoto

(10) Patent No.: US 6,617,755 B2
(45) Date of Patent: Sep. 9, 2003

(54) PIEZOELECTRIC ACTUATOR DRIVE CIRCUIT AND FUEL INJECTION SYSTEM

(75) Inventor: Satoru Kawamoto, Chita-gun (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 09/988,184

(22) Filed: Nov. 19, 2001

(65) Prior Publication Data

US 2002/0117939 A1 Aug. 29, 2002

(30) Foreign Application Priority Data

Feb. 23, 2001 (JP) ........................ 2001-047769

(51) Int. Cl.⁷ .............................. H02N 2/16; H02L 41/09
(52) U.S. Cl. .................... 310/316.03; 310/311
(58) Field of Search ............................ 310/316.03, 311; H02N 2/06; H01L 41/09

(56) References Cited

U.S. PATENT DOCUMENTS

| | | | | |
|---|---|---|---|---|
| 4,378,552 A | * | 3/1983 | Jalbert | 341/30 |
| 4,494,507 A | * | 1/1985 | Yasuhara | 123/357 |
| 4,535,743 A | * | 8/1985 | Igashira et al. | 123/472 |
| 4,887,569 A | * | 12/1989 | Igashira et al. | 123/300 |
| 4,924,713 A | * | 5/1990 | Machino et al. | 73/862.06 |
| 4,965,532 A | * | 10/1990 | Sakurai | 331/4 |
| 5,013,955 A | * | 5/1991 | Hara et al. | 310/323.21 |
| 5,097,171 A | * | 3/1992 | Matsunaga et al. | 310/316.01 |
| 5,130,598 A | * | 7/1992 | Verheyen et al. | 310/316.03 |
| 5,545,954 A | * | 8/1996 | Furukoshi | 318/116 |
| 5,734,236 A | * | 3/1998 | Motegi | 318/114 |
| 6,246,151 B1 | * | 6/2001 | Nakano | 310/316.02 |
| 6,384,512 B1 | * | 5/2002 | Maeda | 310/316.03 |

FOREIGN PATENT DOCUMENTS

| | | | | |
|---|---|---|---|---|
| JP | 1-202177 | | 8/1989 | |
| JP | 3-128679 | | 5/1991 | |
| JP | 07183588 A | * | 7/1995 | H01L/41/09 |
| JP | 2001157472 A | * | 6/2001 | H02N/2/00 |
| JP | 2002134804 A | * | 5/2002 | H01L/41/083 |
| JP | 2002185056 A | * | 6/2002 | H05K/1/05 |
| JP | 2002202022 A | * | 7/2002 | F02M/47/00 |
| JP | 2002246667 A | * | 8/2002 | H01L/41/083 |

* cited by examiner

Primary Examiner—Nestor Ramirez
Assistant Examiner—J. Aguirrechea
(74) Attorney, Agent, or Firm—Nixon & Vanderhye PC

(57) ABSTRACT

A piezoelectric actuator drive circuit has an abnormality detection circuit section. The abnormality detection circuit section is provided with a voltage detection circuit for detecting the voltage of a connection terminal on the non-ground side and a comparison circuit for generating a comparison signal to check whether a detected voltage is higher than a reference voltage or not based on the comparison result between the detected voltage and the reference voltage. If the detected voltage is lower than the reference voltage, it is determined that a cable is disconnected.

7 Claims, 9 Drawing Sheets

PIEZOELECTRIC ACTUATOR DRIVE CIRCUIT AND FUEL INJECTION SYSTEM

CROSS REFERENCE TO RELATED APPLICATION

This application is based on and incorporates herein by reference Japanese Patent Application No. 2001-47769 filed on Feb. 23, 2001.

BACKGROUND OF THE INVENTION

1. Field of the Invention

The present invention relates to a piezoelectric actuator drive circuit and a fuel injection system using the piezoelectric actuator drive circuit.

2. Related Art

A piezoelectric actuator functions based on the piezoelectric effect of a piezoelectric material such as PZT. A piezo-stack, which is a capacitive element, expands or contracts by being charged or discharged, thereby exerting force on a piston, etc. to render a linear motion. The piezoelectric actuator is used in a fuel injector of a fuel injection system for internal combustion engines.

However, if a conduction abnormality such as cable disconnection or contact failure to a connection terminal occurs, the piezo-stack cannot be charged or discharged and there results a malfunction of the piezoelectric actuator. As a result, fuel is not injected when fuel is to be injected. On the other hand, if the cable is disconnected after charging, the piezo-stack cannot be discharged and there results a continuous fuel injection even after the predetermined injection period. Some of the fuel injection system is provided with a fail-safe function that functions mechanically to stop the fuel injection after elapse of a certain time so that a serious failure can be avoided.

JP-A-1-202177 teaches to detect a voltage between both ends of a current detection resistor provided in a current supply path connected to the piezo-stack during the charging operation. If the detected voltage value is lower than a predetermined threshold value, it is determined that normal charging current does not flow due to conduction failure of the cable. The charging to the piezo-stack or a set of the piezo-stacks having a common cable is disabled. However, because the abnormality is detected based on the charge/discharge current, the abnormality detection timing is limited to the start or end of the injection period.

As a result, although the complete disconnection can be detected definitely, jittering in which disconnection and reconnection due to irregular contact to the connection terminal cannot always be detected. Moreover, in the case of jittering, which is different from the complete disconnection in which the piezo-stack already loses charge/discharge capability, it often happens that the fuel injection cannot be stopped due to disabled discharge even though the mechanical fail-safe function is operated.

SUMMARY OF THE INVENTION

It is an object of the present invention to provide a piezoelectric actuator drive circuit and a fuel injection system that is capable of accurately detecting a cable disconnection including jittering.

According to the present invention, a piezoelectric actuator drive circuit has a charge/discharge circuit section for charging and discharging a piezo-stack mounted on a piezoelectric actuator, a pair of positive and negative connection terminals connected to a current supply cable that extends to the piezo-stack, and an abnormality detection circuit section for detecting the conduction abnormality of the current supply cable. The abnormality detection circuit section includes a voltage detection circuit for detecting the voltage at the non-ground side connection terminal out of the connection terminals, and a comparison circuit for comparing the detected voltage with the reference voltage and for supplying a comparison signal.

The voltage at the non-ground side connection terminal falls down below the reference voltage and falls to 0V again when the piezo-stack starts to be discharged in response to a discharge command of the piezo-stack. If the current supply cable happens to be disconnected while the piezo-stack is in the charge holding state, the voltage at the connection terminal, that is, the detected voltage, falls down below the reference voltage even though the piezo-stack holds the charged state. The output of the comparison circuit is inverted resultantly. Thereby, the conduction abnormality of the current supply cable is detected regardless of charging or discharging. Because the detected voltage changes up and down across the reference voltage when jittering occurs, the jittering is detected easily.

BRIEF DESCRIPTION OF THE PREFERRED EMBODIMENT

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
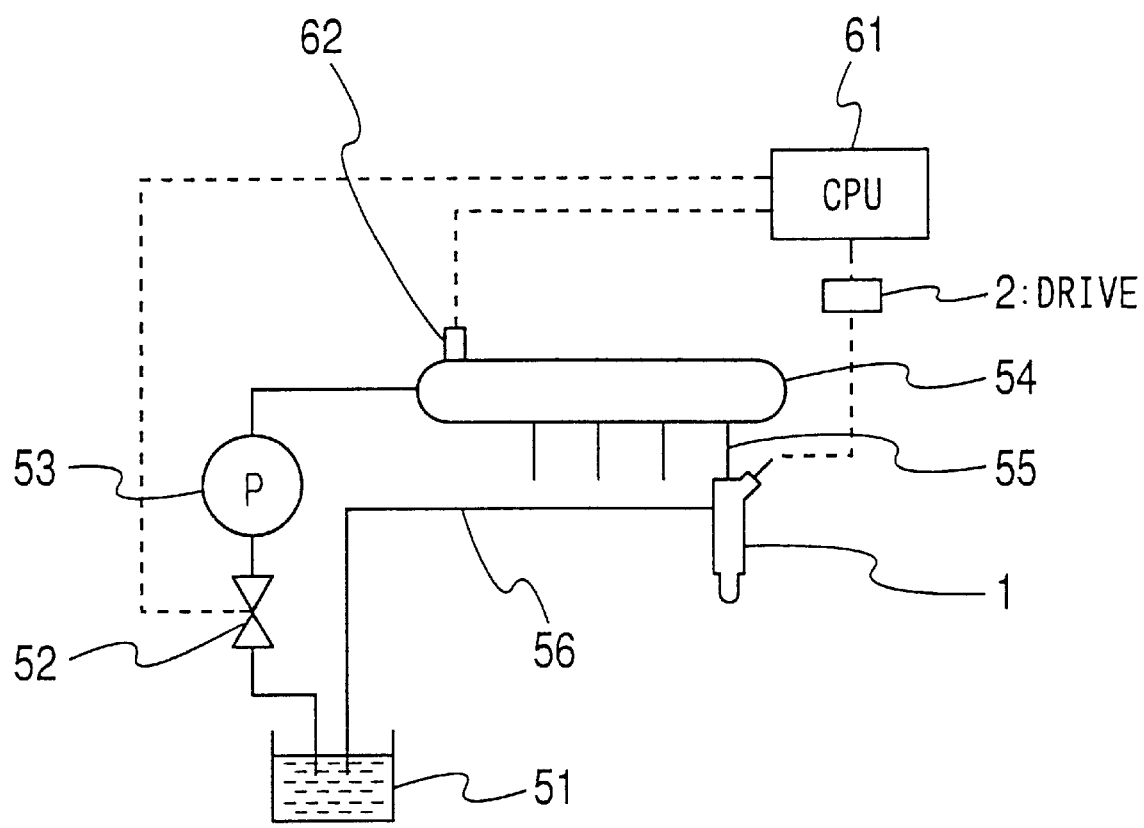
FIG. 1 is a schematic diagram showing a fuel injection system.

Referring first to FIG. 1, a common rail type fuel injection system of a diesel engine has an injector 1 disposed correspondingly to each cylinder. A plurality of injectors 1 are disposed correspondingly to the number of cylinders, but only one injector 1 is shown. The engine receives fuel from common rail 54 communicated through a supply line 55. Fuel is injected with approximately the same pressure as that of the fuel pressure in the common rail 54 (common rail pressure) into the combustion chamber of each cylinder from the injector 1. The common rail 54 receives fuel from a fuel tank 51 by way of a high pressure supply pump 53 with pressure, and stores it at high pressure.

Furthermore, the fuel supplied from the common rail 54 to the injector 1 is served not only for injection to the combustion chamber but also as the control fluid pressure of the injector 1, and the fuel returns partially to the fuel tank 51 from the injector 1 through a low pressure drain line 56.

A CPU 61 calculates the fuel injection period and fuel injection amount, supplies an injection signal corresponding to the calculated signal to a piezoelectric actuator drive circuit 2 to drive the piezoelectric actuator mounted on each injector 1, and the injector 1 injects the fuel from the injector 1 for the calculated period.

Furthermore, the CPU 61 controls the operation so that the injection properly corresponds to the operation condition detected by various sensors. To accomplish this operation, a pressure sensor 62 is provided on the common rail 54, the CPU 61 controls a metering valve 52 based on the common rail pressure so as to adjust the pressurized fuel supply volume supplied to the common rail 54.

Figure 2:
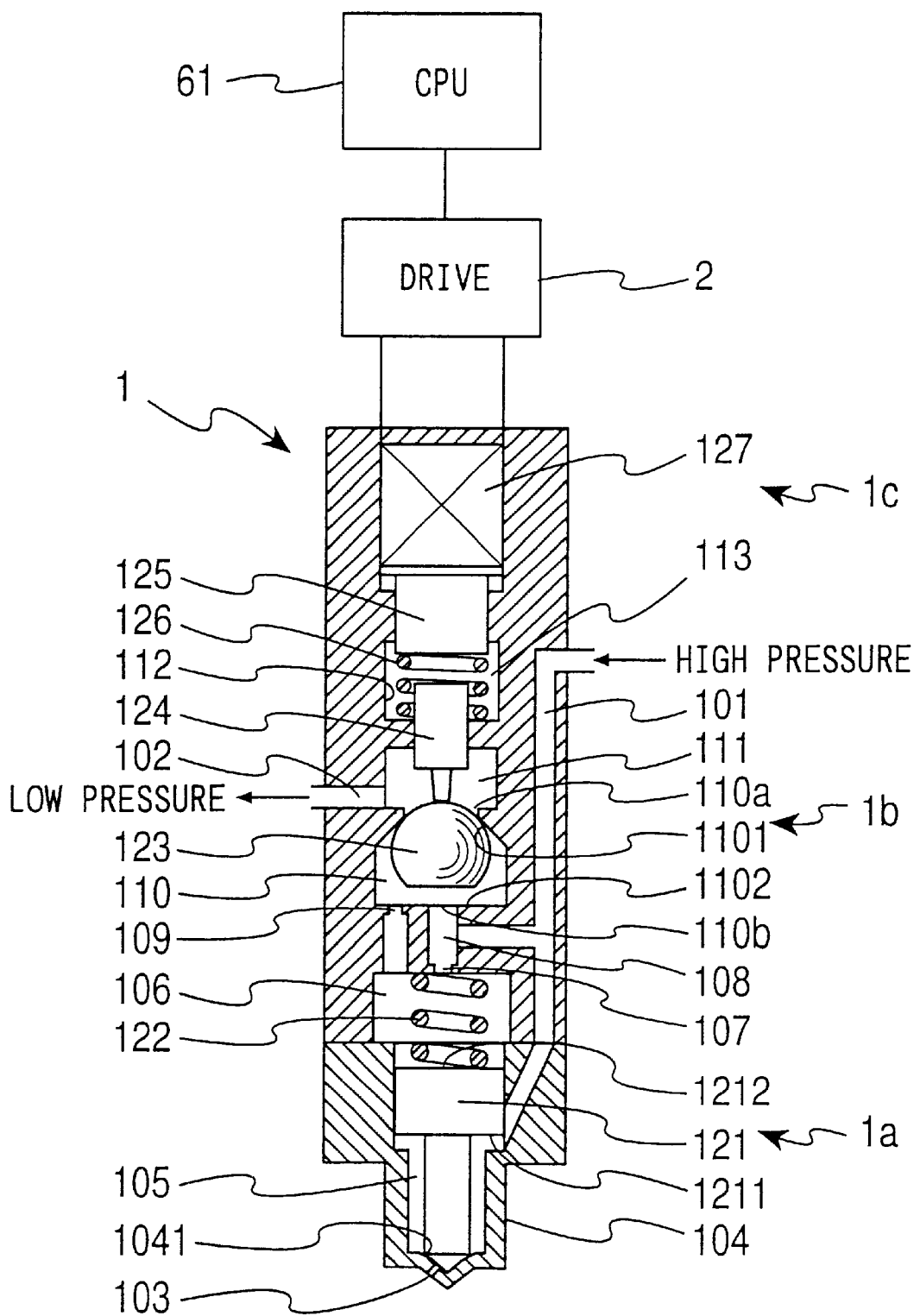
FIG. 2 is a cross-sectional view showing a fuel injector of the fuel injection system.

FIG. 2 shows the injector 1. The injector 1 is fixed so that the lower side section of the injector 1 in the figure is projected into the combustion chamber through the combustion chamber wall of the engine. The injector 1 comprises a nozzle section 1*a*, a back-pressure control section 1*b*, and a piezoelectric actuator 1*c* in order from the bottom.

A rear end section of a needle 121 is held slidably in a sleeve-like body 104 of the nozzle section 1*a*, and the needle 121 is seated on or unseated from a ring seat 1041 formed on the nozzle body 104. High pressure fuel is introduced into a peripheral space 105 from the common rail 54 through a high pressure passage 101, and the fuel is injected from a nozzle hole 103 when the needle 121 is lifted. The fuel pressure supplied from the high pressure passage 101 exerts force in the lift direction (upward direction) on a ring step surface 1211 of the needle 121 from the high pressure passage 101.

Fuel that is served as control fluid is introduced into the rear of the needle 121 from the high pressure passage 101 through an orifice 107, and a back-pressure chamber 106 for generating the back-pressure of the needle 121 is formed. The back-pressure is exerted in the seating direction (downward) on the rear end surface 1212 of the needle 121 together with a spring 122 disposed in the back-pressure chamber 106.

The back-pressure is controlled by the back-pressure control section 1*b*. The the back-pressure control section 1*b* is driven by the piezoelectric actuator 1*c* having a piezo-stack 127.

The back-pressure chamber 106 communicates normally to a valve chamber 110 of the back-pressure control section 1*b* through an orifice 109. The valve chamber 110 is formed in a conical shape having an upper surface 1101 upward. The uppermost portion of the upper surface 1101 has a low pressure port 110*a* that communicates to the low pressure chamber 111. The low pressure chamber 111 communicates to a low pressure passage 102 that communicates to the drain line 56. The bottom surface of the valve chamber 110 has a high pressure port 110*b* that is connected to the high pressure passage 101 through the high pressure control passage 108.

A ball 123 formed by horizontally cutting the lower side of a spherical ball is disposed in the valve chamber 110. The ball 123 serves as a valve body that is movable vertically. The cut surface seats on the valve chamber bottom surface that serves as a valve seat (high pressure side seat) 1102 so as to close the high pressure port 110*b* when the ball 123 moves down and shuts down the high pressure control passage 108.

On the other hand, when the ball 123 is lifted, the ball 123 seats on the upper surface that serves as a valve seat (low pressure side seat) 1101 so as to close the low pressure port 110*a* and shuts down the valve chamber 110 from the low pressure chamber 111. Thereby, the back-pressure chamber 106 communicates to the low pressure chamber 111 through the out orifice 109 and the valve chamber 110 when the ball 123 is lowered, and the back-pressure of the needle 121 is reduced and the needle 121 is unseated. On the other hand, when the ball 123 is lifted, the back-pressure chamber 106 is shut down from the low pressure chamber 111 and communicates with only the high pressure passage 101, the back-pressure of the needle 121 increases and the needle is seated.

The ball 123 is press-driven by means of the piezoelectric actuator 1*c*. Two pistons 124 and 125 having different diameters are held slidably in a vertical hole 112 formed vertically above the low pressure chamber 111. The piezo-stack 127 that expands or contracts in the vertical direction is disposed above the upper larger-diameter piston 125.

The larger-diameter piston 125 is maintained in contact with the piezo-stack 127 by means of the spring 126 provided under the larger-diameter piston 125, and is displaced vertically by the same distance as the expansion/contraction value of the piezo-stack 127.

Fuel is filled in a space defined by the smaller-diameter piston 124 that is facing to the ball 123, the larger-diameter piston 125, and the vertical hole 112 to form a displacement enlarging chamber 113. When the piezo-stack 127 expands to displace the larger-diameter piston 125 downward and the fuel in the displacement enlarging chamber 113 is pressurized, the pressing pressure is transmitted to the smaller-diameter piston 124 through the fuel of the displacement enlarging chamber 113. Because the diameter of the smaller-diameter piston 124 is smaller than that of the larger-diameter piston 125, the expansion volume is enlarged and converted to the displacement of the smaller-diameter piston 124.

At first, the piezo-stack 127 is charged to be expanded so that the small diameter piston 124 is lowered to press down the ball 123 when fuel is to be injected. Thereby, the ball 123 is lifted from the low pressure side seat 1101 and seated on the high pressure side seat 1102 to communicate the back-pressure chamber 106 to the low pressure passage 102. As a result, the fuel pressure in the back-pressure chamber 106 is lowered. Thereby, the force exerted on the needle 121 in the unseating direction becomes predominant over the force exerted in the seating direction, and the needle 121 is unseated and the fuel injection starts.

On the other hand, when the injection is to be stopped, the piezo-stack 127 is discharged to result in contraction of the piezo-stack 127, and the press down force exerted on the ball 123 is released. At that time, the pressure in the valve chamber 110 is low and the high fuel pressure is exerted on the bottom surface of the ball 123 yet from the high pressure control passage 108, and the upward fuel pressure is exerted on the ball 123 as a whole. The ball 123 is unseated from the high pressure side seat 1102 when pressing down force exerted on the ball 123 is released. The ball 123 is seated on the low pressure side seat 1101 again to increase the fuel pressure of the valve chamber 110. As a result, the needle 121 is seated and the injection is stopped.

Figure 3:
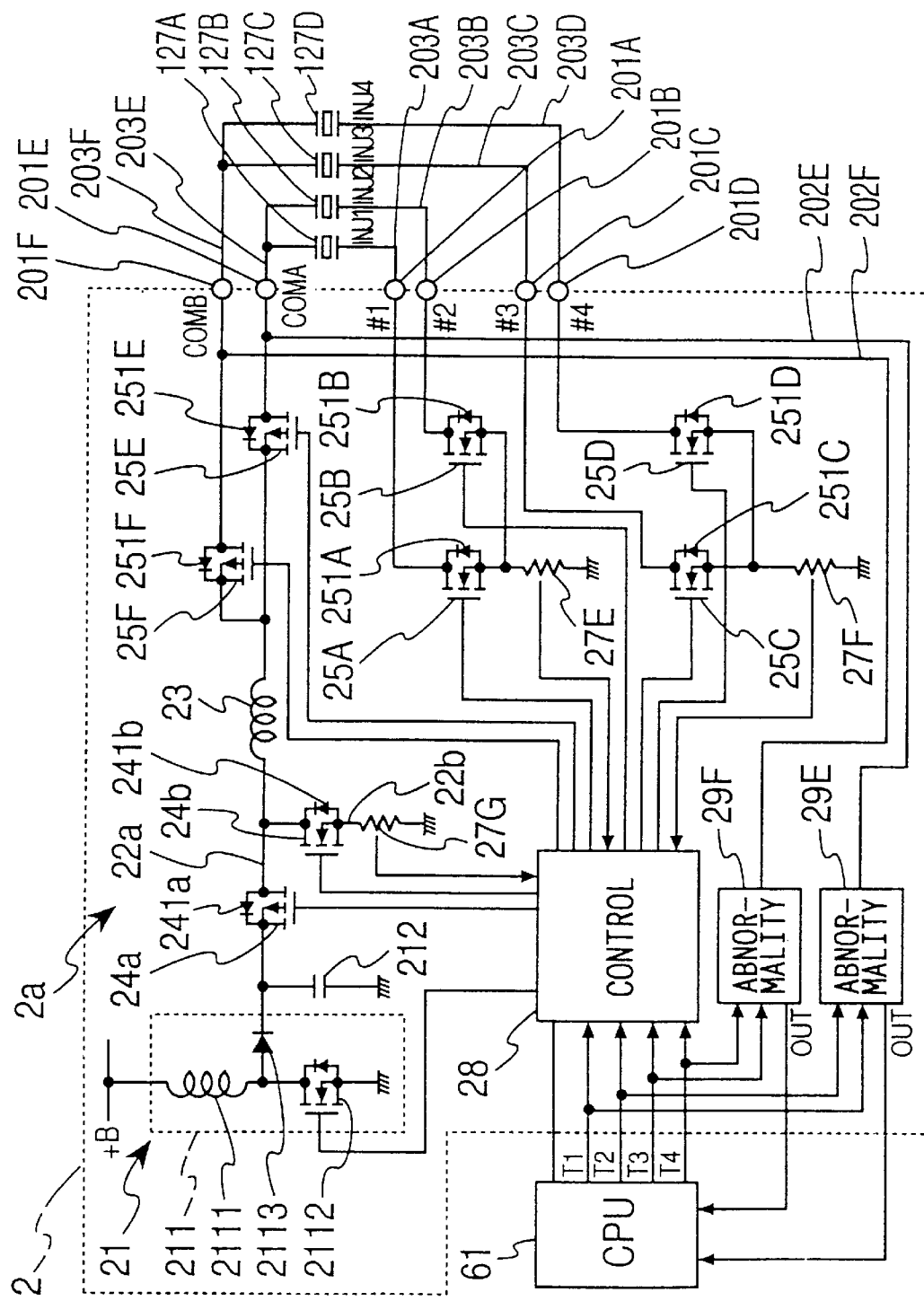
FIG. 3 is a circuit diagram showing a piezoelectric actuator drive circuit according to a first embodiment of the present invention.
Figure 4:
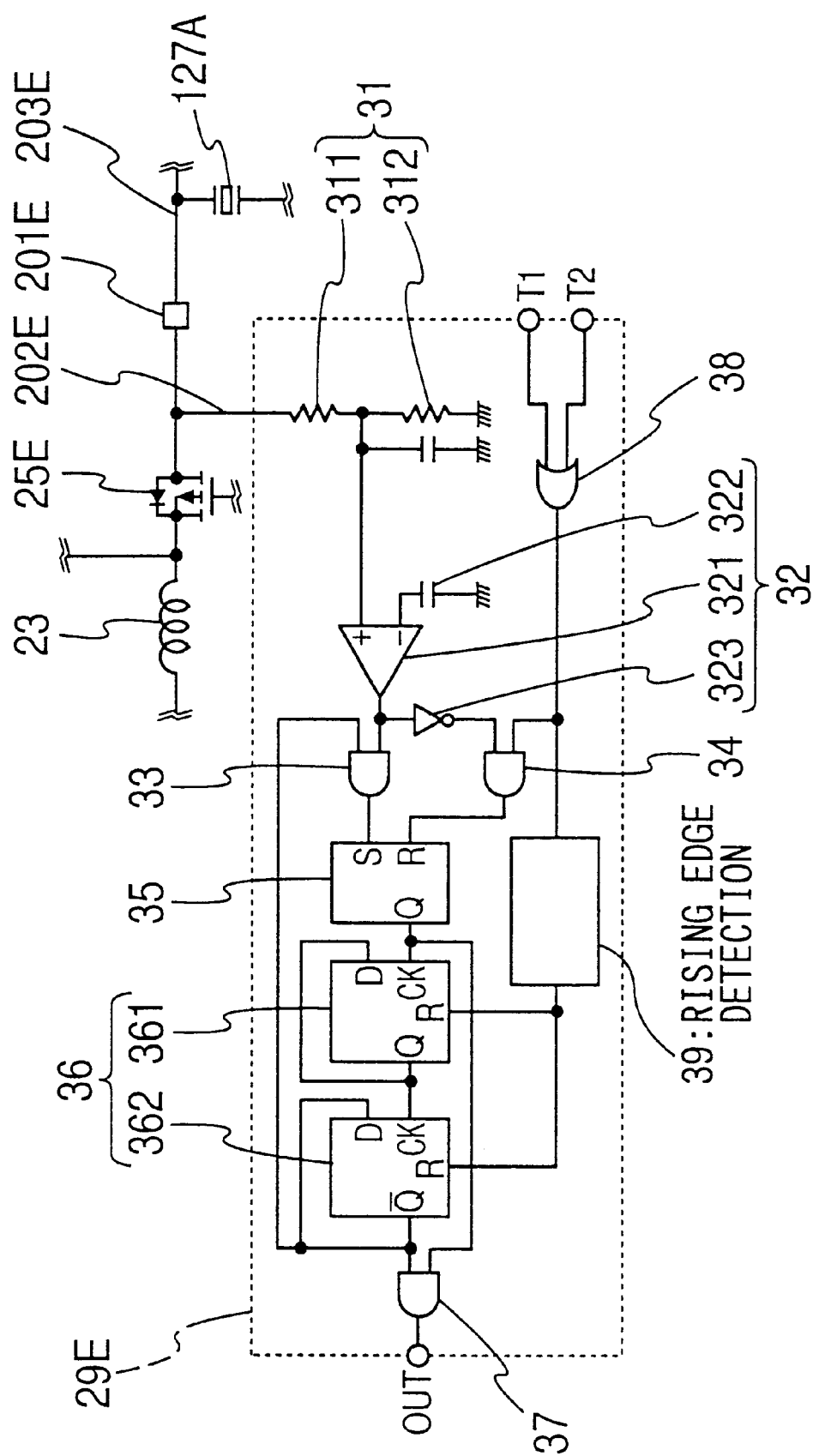
FIG. 4 is a circuit diagram showing an abnormality detection circuit of the piezoelectric actuator driving circuit.

FIG. 3 and FIG. 4 show the piezoelectric actuator drive circuit 2 that is served for charging and discharging the piezo-stack 127. The piezo-stack 127 comprises a piezo-stack 127A, a piezo-stack 127B, a piezo-stack 127C, and a piezo-stack 127D corresponding to four cylinders in the order from that of the first cylinder. The piezoelectric actuator drive circuit 2 is provided with a charge/discharge circuit section 2a, which is the main section, and abnormality detection circuit sections 29E and 29F.

The charge/discharge circuit section 2a comprises a DC—DC converter 211 for generating a DC voltage of several tens to several hundreds volts from the power supply (+B) of an on-vehicle battery and a buffer capacitor 212 connected to the output terminal in parallel to form a DC power source 21. The charge/discharge circuit section 2a supplies a voltage for charging the piezo-stacks 127A to 127D. A general voltage-booster chopper type converter may be used as the DC—DC converter 211. Energy is stored in an inductor 2111 while a switching element 2112 is being turned on and the buffer capacitor 212 is charged from the inductor 2111 that generates a counter electromotive force through the diode 2113 while the switching element 2112 is being turned off. The buffer capacitor 212 has a sufficient static capacitance so as to maintain an approximately constant voltage value when the piezo-stacks 127A to 127D are charged.

A first current supply path 22a is provided for supplying a charging current to the piezo-stacks 127A to 127D from the buffer capacitor 212 of the DC power source 21 through the inductor 23. A first switching element 24a is provided between the buffer capacitor 212 and the inductor 23 in series. The first switching element 24a comprises a MOSFET, and is connected so that the parasitic diode (first parasitic diode) 241a functions as the reverse bias with respect to the voltage between both ends of the buffer capacitor 212.

Furthermore, the inductor 23 and the piezo-stacks 127A to 127D form a second current supply path 22b. The current supply path 22b has a switching element 24b that is connected to the middle point between the inductor 23 and the first switching element 24a, and forms a closed circuit that include the inductor 23, the piezo-stacks 127A to 127D, and the second switching element 24b. The second switching element 24b also comprises a MOSFET, and is connected so that the parasitic diode (second parasitic diode) 241b functions as the reverse bias with respect to the voltage between both ends of the buffer capacitor 212.

The current supply passages 22a and 22b are used commonly for the respective piezo-stacks 127A to 127D. The piezo-stacks 127A to 127D are selected as the drive target as described hereinunder. Selection switching elements 25A, 25B, 25C, 25D, 25E, and 25F are connected to the respective piezo-stacks 127A to 127D in series. The first type selection switching elements 25A to 25D are connected to the piezo-stacks 127A to 127D through ground side connection terminals 201A, 201B, 201C, and 201D provided correspondingly to each cylinder. Current supply cables 203A, 203B, 203C, and 203D connect between the connection terminals 201A to 201D and the piezo-stacks 127A to 127D, respectively. A selection switching element 25A to 25D is connected to a respective piezo-stack 127A to 127D, which corresponds to the injection cylinders, and is turned on selectively when fuel is to be injected to the corresponding injection cylinder.

The second type selection switching elements 25E and 25F are connected to the piezo-stacks 127A to 127D through the power source side (non-ground side) connection terminals 201E and 201F. The sections between the power source side connection terminals (common terminal) 201E and 201F (COMA and COMB) and the piezo-stacks 127A to 127D serves as fork current supply cables 203E and 203F. On the other hand, the current supply cable 203E is commonly used for both piezo-stack 127A and piezo-stack 127B, and the other current supply cable 203F is commonly used for both piezo-stacks 127C and piezo-stack 127D.

The selection switching element 25E serves to switch the current supply between ON and OFF to the bank of the injectors 1 (INJ1 and INJ2) of the #1 and #2 cylinders on which the piezo-stacks 127A and 127B are mounted. The selection switching element 25F serves to switch the current supply between ON and OFF to the bank of the injectors 1 (INJ3 and INJ4) of the #3 and #4 cylinders on which the piezo-stacks 127E and 127F are mounted. For example, even if any one of the current supply cables 203E and 203F is ground-shorted, the selection switching elements 25E and 25F corresponding to the ground-shorted current supply cable is turned off and the function of the other bank is ensured (limp home operating mode).

A MOSFET is used for each of the selection switching elements 25A to 25F, and the parasitic diodes (selection parasitic diode) 251A, 251B, 251C, 251D, 251E, and 251F are connected so as to function as the reverse bias with respect to the buffer capacitor 212.

A controller 28 supplies control signals to each gate of the switching elements 24a, 24b, 25A to 25F to select drive target piezo-stacks 127A to 127D by turning on any one of the selection switching elements 25A to 25D as described above. Pulse control signals are supplied to each gate of the switching element 24a and 24b to operate the switching elements 24a and 24b between ON and OFF. As a result, the charge control and discharge control of the piezo-stacks 127A to 127D are performed.

A relatively low resistance resistor 27E is provided commonly to the piezo-stacks 127A and 127B in series, and the same resistor 27F as the resistor 27E is provided commonly to the piezo-stack 127C and the piezo-stack 127B in series. The voltage between both ends is supplied to the controller 28 so that the charging current of the piezo-stacks 127A to 127D is detected.

A relatively low resistance resistor 27G is provided to the second switching element 24b in series. The voltage between both ends is supplied to the controller 28 so that the discharging current of the piezo-stacks 127A to 127D is detected.

Furthermore, the voltage between both ends (piezo-stack voltage) of each of the piezo-stacks 127A to 127D, that is the charging value, is supplied to the controller 28.

The controller 28 receives injection signals T1 to T4 from the CPU 61 to inject fuel into a selected injection cylinder. An injection signal is a binary signal, "L" or "H". The piezo-stacks 127A to 127D start to be charged at the rise of the signal, and start to be discharged at the fall of the signal. The injection signal is generated one-to-one correspondingly to each cylinder. The controller 28 maintains the corresponding selection switching elements 25A to 25D ON while the injection signal is being generated.

The controller 28 sets the ON period and OFF period of the first switching element 24a during charging control as described hereinunder, and generates the control signal to control the first switching element 24a. That is, the first switching element 24a is turned on to supply an increasing charge current to the first current supply path 22a. When the charge current reaches a predetermined upper limit current value, the switching element 24a is turned off and enters into an OFF period.

At that time, because the counter electromotive force generated in the inductor 23 acts as a forward bias with respect to the parasitic diode 241b of the second switching element 24b, a decreasing flywheel current flows through the second current supply path 22b based on the energy stored in the inductor 23, and the piezo-stacks 127A to 127D are charged increasingly. When the charge current reaches the lower limit current value (approximately zero), the first switching element 24a is turned on and enters into an ON period again, and such operation is repeated (multiple switching system).

When the piezo-stack voltage reaches a predetermined voltage, the switching element 24a is turned OFF and the charging is completed. The piezo-stacks 127A to 127D are charged as described hereinabove, the piezo-stacks 127A to 127D are resultantly expanded so as to press and lift the ball 123 with interposition of the displacement enlarging chamber 113.

ON and OFF periods of the second switching element 24b are set as described hereinunder during discharge control, and the control signal for controlling the second switching element 24b is produced.

Specifically, the second switching element 24b is turned on to supply increasing discharge current to the second current supply path 22b. When the discharge current reaches the predetermined current value (upper limit current value), the switching element 24b is turned off and enters into an OFF period. At that time, a large counter electromotive force is generated in the inductor 23, a flywheel current generated from the energy stored in the inductor 23 flows through the first current supply path 22a, and the energy is recovered in the buffer capacitor 212.

When the discharge current reaches the lower limit current value (approximately zero), the second switching element 24b is turned on again, and the above operation is repeated. When the piezo-stack voltage reaches 0, the switching element 24b is fixed at OFF, and the discharge is completed. As described above, the piezo-stacks 127A to 127D are discharged so as to be contracted, and the pressing force arising from the fuel pressure in the displacement enlarging chamber 113 exerted on the ball 123 is released and the ball 123 is seated.

If the piezo-stacks 127A to 127D are disabled so as to be discharged due to disconnection of the current supply cables 203A to 203F, the injector 1 injects fuel continuously even after the end of the fuel injection period specified by the injection signal. However, the injector 1, shown in FIG. 2, is provided with a mechanical fail-safe mechanism that closes the valve when the charged state time of the piezo-stack 127 exceeds a predetermined period.

Specifically, the injector 1 pressurizes the fuel in the displacement enlarging chamber 113 by means of expansion of the piezo-stack 127 to generate the pressing pressure exerted on the ball 123. The fuel pressure becomes sufficiently larger to overcome the upward pressing force exerted on the ball 123 when the ball is lifted. Therefore, the pressurized fuel in the displacement enlarging chamber 113 leaks to the low pressure space such as the low pressure chamber 111 little by little from sliding section of the pistons 124 and 125. The lift magnitude of the ball 123 is decreased to reduce the fuel flow rate flowing from the back-pressure chamber 106 to the low pressure chamber 111, the back-pressure decreases gradually thereby, and at last the needle is seated to stop the fuel injection.

Furthermore, a first wiring pattern 202E that is conductive to the common terminal 201E (COMA) and a second wiring pattern 202F that is conductive to the common terminal 201F (COMB) are formed on the piezoelectric actuator drive circuit 2. Both wiring patterns are connected to abnormality detection circuit sections 29E and 29F, respectively. Furthermore, the first cylinder injection signal (T1) and the second cylinder injection signal (T2) are supplied to the abnormality detection circuit section 29E, and the third cylinder injection signal (T3) and the fourth cylinder injection signal (T4) are supplied to the abnormality detection circuit section 29F.

The first abnormality detection circuit section 29E detects the conduction abnormality such as disconnection of the current supply cables 203A, 203B, and 203E for the first and second piezo-stacks 127A and 127B and detects the conduction abnormality such as the contact failure to the connection terminals 201A, 201B, and 201E. The second abnormality detection circuit section 29F detects the conduction abnormality such as disconnection of the current supply cables 2030, 203D, and 203F for the third and fourth piezo-stacks 127C and 127D and detects the conduction abnormality such as contact failure to connection terminals 201C, 201D, and 201F. The abnormality detection signal generated from each of the abnormality detection circuit sections 29E and 29F is supplied to the CPU 61, and the CPU 61 performs the predetermined operation, if the abnormality is found, as described in the limp home mode.

The circuit configuration is common for both abnormality detection circuit sections 29E and 29F, and only the first abnormality detection circuit section 29E will be described hereinunder. In FIG. 4 showing the detail of the abnormality detection circuit section 29E, the voltage of the common terminal 201E is taken in through the wiring pattern 202E, and divided by means of a pair of resistors 311 and 312. The resistors 311 and 312 constitute a voltage detection means 31, and the voltage detection means 31 is easily handled by a succeeding logic calculation circuit which is operable with a voltage lower than the piezo-stack voltage.

The divided common terminal voltage Vcom is supplied to the (+) input terminal of a comparator 321. The comparator 321 compares the voltage of the (+) input terminal with a voltage Vref that is generated from a constant voltage generator 322 and supplied to the (−) input terminal, determines whether the common terminal voltage Vcom is larger than the reference voltage Vref specified by the constant voltage generator 322 or not, and generates a binary signal Vcomp ("H" or "L") depending on the comparison result. The binary signal is a signal that rises when the common terminal voltage exceeds the reference voltage (this signal is referred to as the first comparison signal). The magnitude of the reference voltage Vref is set in consideration of the target charge voltage of the piezo-stacks 127A and 127B so as to check whether the piezo-stacks 127A and 127B are in the charge holding state or not.

Furthermore, the binary signal Vcomp generated from the comparator 321 is inverted by means of a NOT gate circuit 323, and serves as the second comparison signal that rises when the common terminal voltage Vcom becomes lower than the reference voltage Vref opposite to the first comparison signal. The comparator 321, the constant voltage generator 322, and the NOT gate circuit 323 constitute a comparison means 32, and the comparison means 32 generates two comparison signals in inverse phase to each other.

The first comparison signal Vcomp is supplied to a set terminal (S) of an S-R flip-flop circuit 35 through the first AND gate circuit 33 that serves as the set input value fixing means. Furthermore, the second comparison signal is supplied to a reset terminal (R) of the S-R flip-flop circuit 35 through the second AND gate circuit 34 that serves as the reset input value fixing means.

A binary counter 36 receives the output (Q) of the S-R flip-flop circuit 35 as an input and serves as a counting means comprising two D-flip-flop circuits 361 and 362. The inverse output of the upper bit of the binary counter 36 is supplied to the third AND gate circuit 37 which also receives the output (Q) of the S-R flip-flop circuit 35. The output of the AND gate circuit 37 is supplied to the CPU 61 as the abnormality detection signal for checking whether the conduction of either of the current supply cables 203A to 203F is abnormal or not.

The inverted phase output of the binary counter 36 is supplied to the first AND gate circuit 33 together with the comparison signal Vcomp of the first comparative signal. Therefore, the output value (non-inverted output Q) of the binary counter 36 remains at "L" until the binary counter 36 counts "10", and the first comparison signal is actually supplied to the set terminal of the S-R flip-flop circuit 35. When two pulses are supplied to the binary counter 36, the inverted phase output (inverted output of Q) of the binary counter 36 is changed from "H" to "L", and the set terminal of the S-R flip-flop circuit 35 is fixed at "L" and becomes insensitive to the first comparison signal.

An OR gate circuit 38 receives the first injection signal T1, corresponding to the first piezo-stack 127A, and the second injection signal T2, corresponding to the second piezo-stack 127B. The output of the OR gate circuit 38 is supplied to the second AND gate circuit 34 together with the second comparison signal. Therefore, while any one of the injection signal T1 and the injection signal T2 is being supplied, the second comparison signal is supplied to the reset terminal of the S-R flip-flop circuit 35.

Furthermore, a rising edge detection circuit 39 to which the logical output of the OR gate circuit 38 is supplied as an input, detects the rising edge of an output signal waveform of the OR gate circuit 38. When a rising edge is detected, reset signals are supplied to the respective D flip-flop circuit 361 and 362 of the binary counter 36.

The abnormality detection circuit section 29F receives the common terminal voltage Vcom of the common terminal 201F, the #3 cylinder injection signal T3, and the #4 cylinder injection signal T4, and supplies an abnormality detection signal to check whether the current supply cables 203C, 203D, and 203F are abnormal or not.

Figure 5:
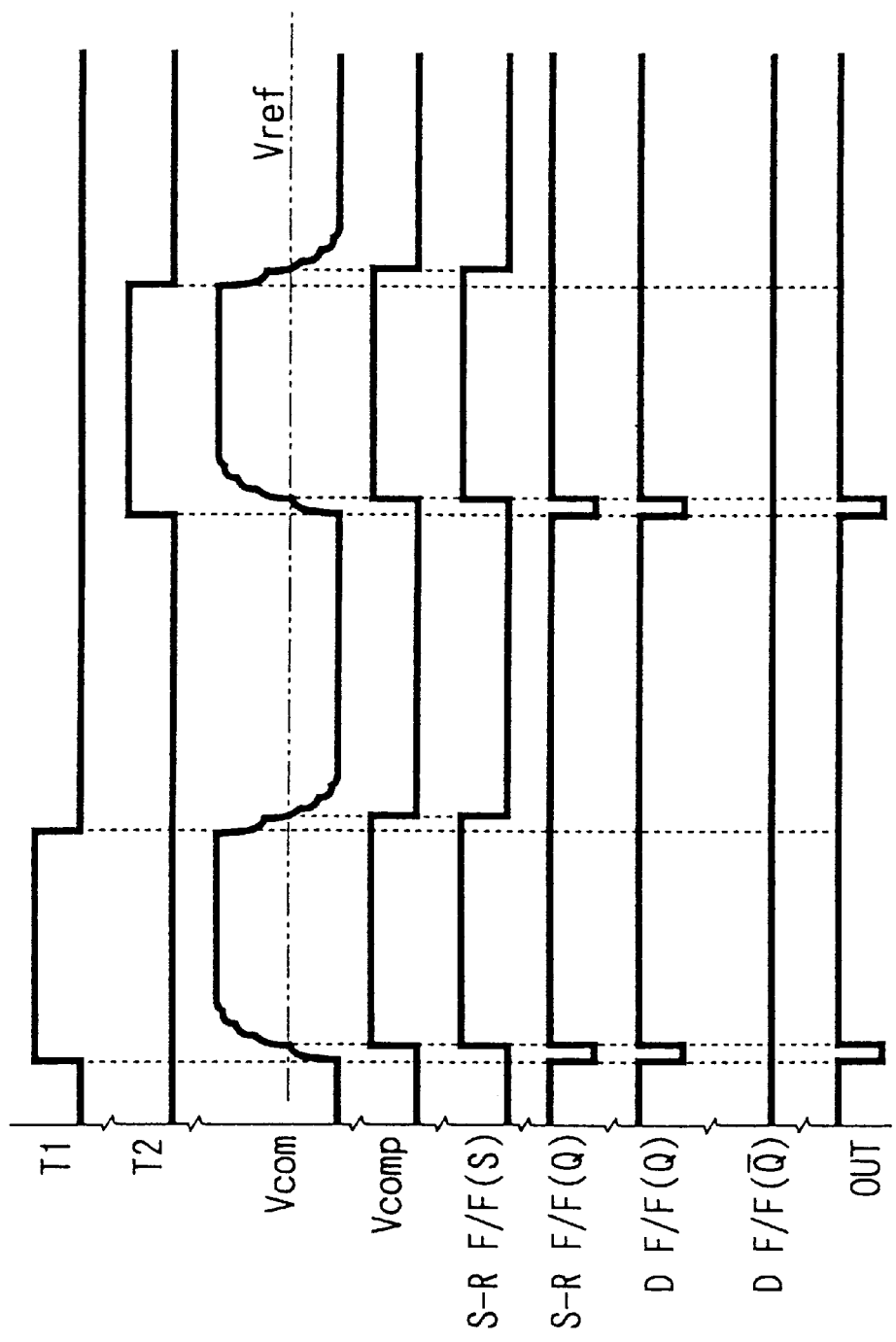
FIG. 5 is a timing chart showing an operation of each section of the piezoelectric actuator drive circuit.
Figure 6:
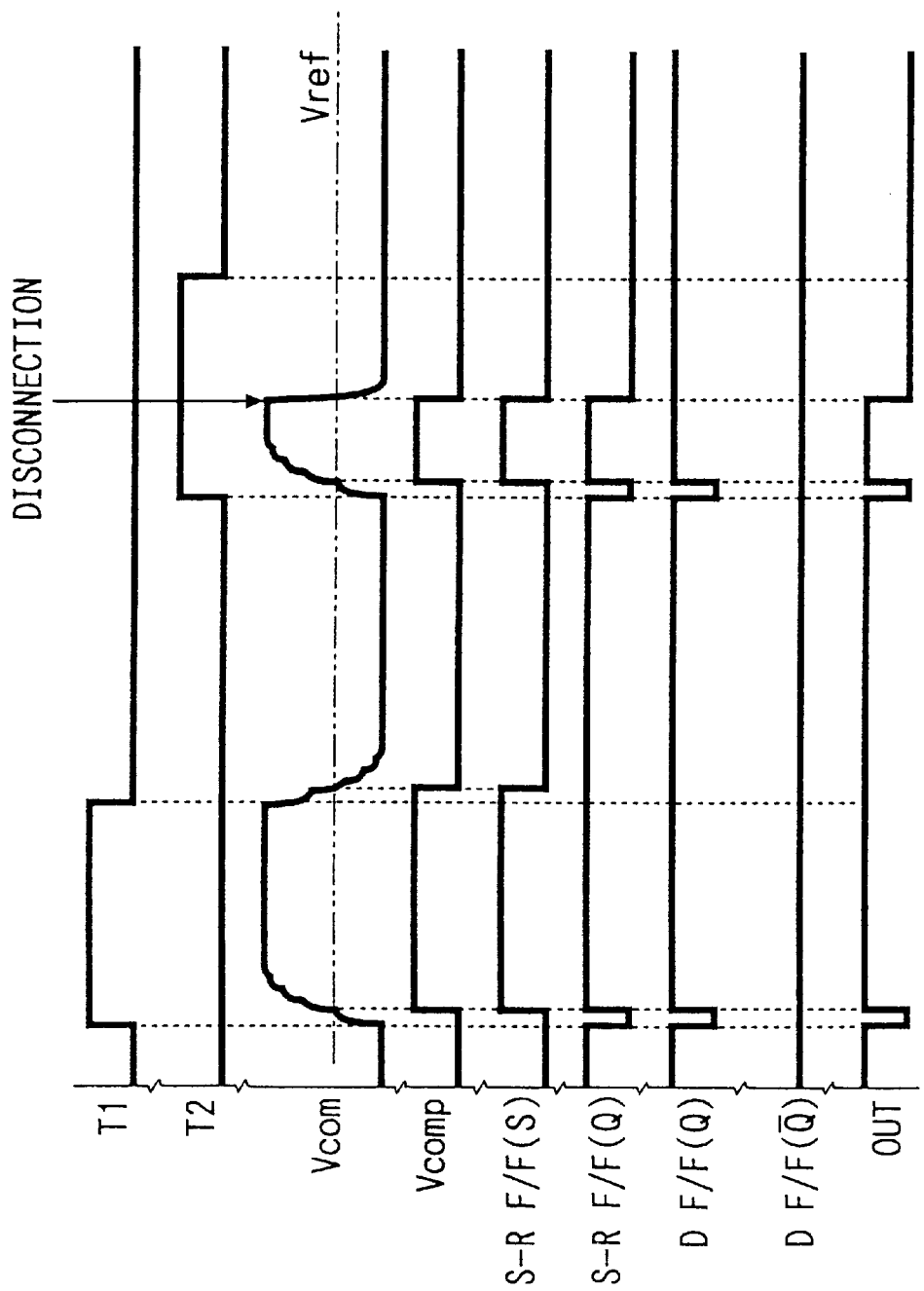
FIG. 6 is a timing chart showing another operation of each section of the piezoelectric actuator drive circuit.
Figure 7:
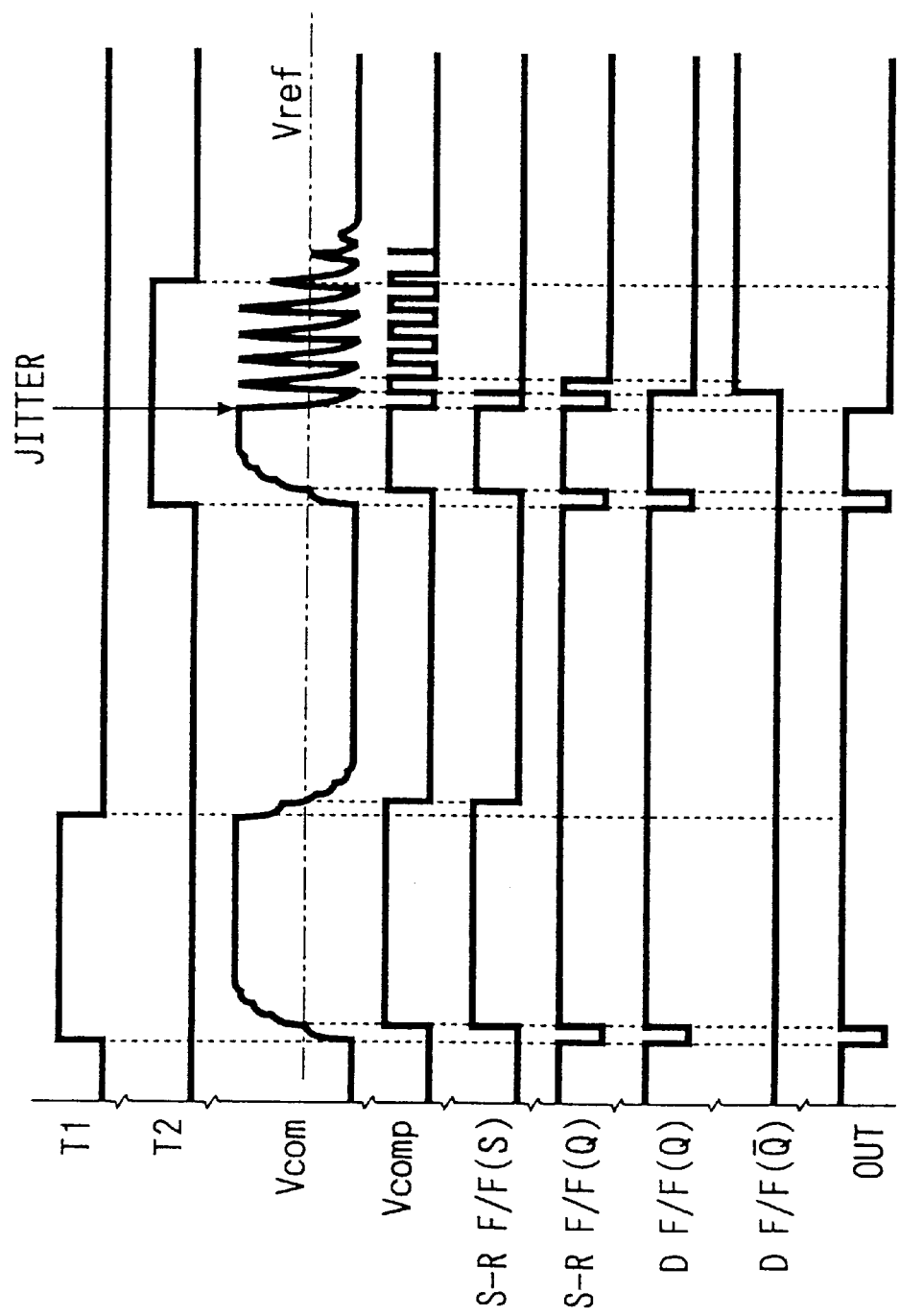
FIG. 7 is a timing chart showing a further operation of each section of the piezoelectric actuator drive circuit.

FIG. 5, FIG. 6, and FIG. 7 are timing charts showing operation of each section of the respective abnormality detection circuits. The operation that is attained when a conduction failure is found on the current supply cables 203A and 203F during the charge holding period of the piezo-stacks 127A to 127D will be described with reference to these figures. The #1 and #2 cylinder abnormality detection circuit section 29E will be described.

FIG. 5 shows a normal state in which there is no conduction abnormality in any of the #1 and #2 cylinders. In the initial state the detection voltage Vcom is lower than the reference voltage Vref, and the first comparison signal Vcomp is "L" and the second comparison signal is "H". The output value of the second AND gate circuit 34 is "L". When an injection signal T1 for selecting the #1 cylinder rises, the output value of the second AND gate circuit 34 changes to "H". As a result, the output value of the S-R flip-flop circuit 35 remains in "L" regardless of the previous output value. Therefore, the output value, abnormality detection, of the third AND gate circuit 37 is "L".

Furthermore, because the binary counter 36 is reset and the injection signal T1 rises, the one input value of any one of the AND gate circuits 33 and 34 is "H", the input value of the set terminal of the S-R flip-flop circuit 35 is equal to that of the first comparison signal Vcomp, and the input value of the reset terminal is equal to that of the second comparison signal.

When any one of the piezo-stacks 127A and 127B starts to be charged and the piezo-stack voltage exceeds the reference voltage, the first comparison signal Vcomp rises from "L" to "H". The input value supplied to the set terminal of the S-R flip-flop circuit 35 resultantly changes from "L" to "H" and the output value changes from "L", to "H". Because the upper bit inverted output of the binary counter 36 is "H", the abnormality detection signal changes to "H".

When the injection signal T1 changes from "H" to "L", the output value of the OR gate circuit 38 changes to "L". The input value of the reset terminal of the S-R flip-flop circuit 35 is fixed at "L". Thereby, the piezo-stack 127A or 127B starts to be discharged. The output value of the S-R flip-flop circuit 35 remains in "H", even though the common terminal voltage falls below the reference voltage Vref, and the abnormality detection signal remains in "H".

In the above operation, the CPU 61 determines the #1 cylinder current supply cables 203A and 203E to be normal based on the abnormality detection signal at the predetermined timing after, for example, the injection signal T1. As described above, because the third AND gate circuit 37 holds the state of falling down of the previous injection signal T1 until the next injection signal T2 is supplied, the timing for monitoring the abnormal detection signal by means of the CPU 61 is not limited substantially.

Thereafter, when the injection period of the #2 cylinder comes, the injection signal T2 is supplied for a predetermined period. The same signal change occurs in each section as in the case of the #1 cylinder.

Next, the operation that occurs when the current supply cables 203B and 203E are disconnected completely or come off from the common terminal 201E during injection period of the #2 cylinder will be described with reference to FIG. 6.

The same operation proceeds until the disconnection occurs, but the common terminal voltage Vcom drops toward 0V when the disconnection occurs. On the way to 0V, the common terminal voltage Vcom becomes lower than the reference voltage Vref. The first comparison signal and the input value of the set terminal of the S-R flip-flop circuit 35 change from "H" to "L", and the second comparison signal and the input value of the reset terminal of the S-R flip-flop circuit change from "L" to "H". Thereby, the output value of the S-R flip-flop circuit 35, that is, the input value of the third AND gate circuit 37, changes from "H" to "L". Thereby, the abnormality detection signal also changes from "H" to "L". This state remains unchanged after falling down of the injection signal T2. As a result, the CPU 61 can detect the conduction abnormality of the current supply cables 203B and 203E.

Next, the operation that occurs when jittering or chattering occurs in the current supply cables 203B and 203E during the injection period of the #2 cylinder will be described with reference to FIG. 7.

The same operation proceeds as described above until the first conduction shutdown occurs. The common terminal voltage Vcom drops to 0V and the conduction is restored again, and the common terminal voltage restores to a voltage that is approximately equal to the target voltage. This operation is repeated. The first and second comparison signals change between "H" and "L" repeatedly.

On the other hand, when the conduction is restored after the first conduction shutdown, the common terminal voltage Vcom exceeds the reference voltage Vref, and the input value of the set terminal of the S-R flip-flop circuit 35 changes from "L" to "H". This change is the second change subsequent to the charge.

Thereby, because the output value of the lower bit D flip-flop circuit 361 changes again to "L" and the output value of the D flip-flop circuit 362 changes to "H", the output value of the first AND gate circuit 33 to which the inverse output of the upper bit D flip-flop circuit 362 is supplied changes to "L". The abnormality signal remains in "L".

Next, when the conduction shutdown occurs again, the second comparison signal Vcomp changes from "L" to "H", the input value of the reset terminal of the S-R flip-flop circuit 35 changes to "H", and the output value of the S-R flip-flop circuit 35 changes to "L" resultantly.

Thereafter, the input value of the set terminal of the S-R flip-flop circuit 35 remains in "L" state due to the inverted output ("L") of the upper bit D flip-flop circuit 362 even though the conduction shutdown and conduction restoration are repeated. The first comparison signal changes from "L" to "H", and the abnormality detection signal remains in "L" state without count-up of the binary counter 36.

This abnormality detection signal remains in "L" state even after the injection signal T2 falls down. Through the sequential operation described above, the CPU 61 can detect the conduction abnormality of the current supply cables 203B and 203E.

According to the present embodiment, a conduction abnormality such as complete disconnection and uttering can be found based on a single abnormality detection signal. Furthermore, it is possible to distinguish between complete disconnection and uttering based on the output value (or inverted output value) of the upper bit D flip-flop circuit 362 when the abnormality detection is in "L" state that indicates the abnormality.

In this embodiment, the second AND gate circuit 34 is provided so that the input value of the reset terminal of the S-R flip-flop circuit 35 is fixed in "L" state when the injection to signal T1 and the injection signal T2 fall down. The output "H" for indicating that the current supply cables 203A, 203B, and 203E are normal is supplied from the AND gate circuit 37 even though the second comparison signal is "H" due to the discharge of the piezo-stacks 127A and 27B. However, if the determination timing of the CPU 61 occurs before the common terminal voltage Vcom falls down below the reference voltage Vref due to the discharge, for example, at the time point of falling down of the injection signal, it is not always necessary to provide the second AND gate circuit 34.

Figure 8:
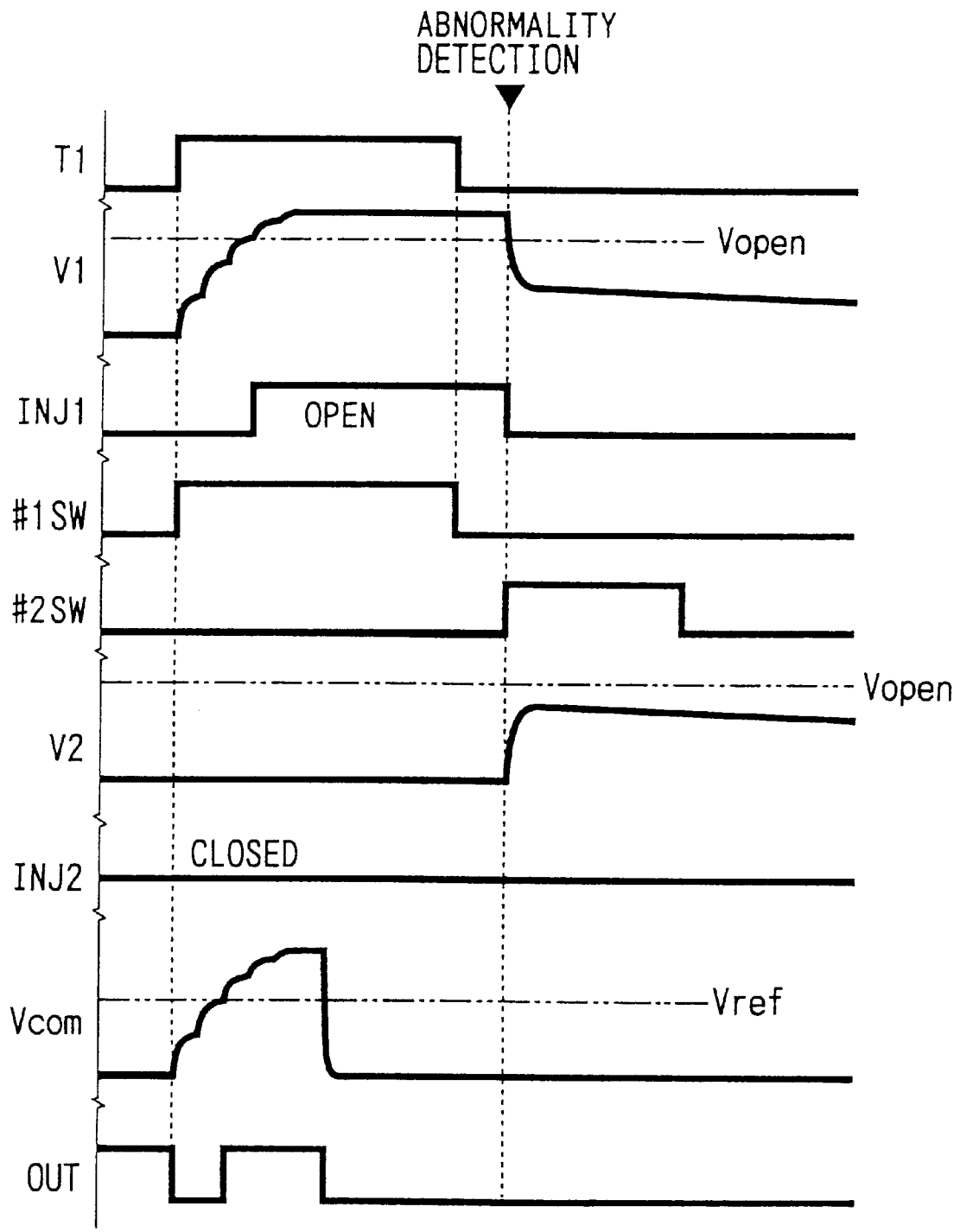
FIG. 8 is a timing chart showing an operation of each section of the fuel injection system.

In this embodiment, the injector 1 stops fuel injection after elapse of a predetermined period by means of the mechanical fail-safe mechanism even if the conduction abnormality occurs after the piezo-stacks 127A to 127D are charged. However, it is possible to stop the fuel injection earlier by executing the next control when the abnormality is found if the abnormality involves the current supply cable 203E coming off from the common terminal 201E or disconnection of the common section of the current supply cable 203E. FIG. 8 shows the state in which the piezo-stack 127A of the #1 cylinder injector INJ1 is disconnected.

When the injection signal T1 rises, the piezo-stack 127A of the #1 cylinder is charged up to the target voltage. When the piezo-stack voltage V1 exceeds the valve opening voltage Vopen of the injector 1 near the target voltage, the injector 1 is opened and starts fuel injection. Subsequently, when the injection signal T1 falls down at the time calculated by means of the CPU 61, the injector 1 maintains the valve in open state without discharge due to the conduction abnormality instead of discharge of the piezo-stack 127A.

The CPU 61 monitors the abnormality detection signal ("L") that indicates the abnormality at the predetermined timing after falling down of the injection signal T1 as described above. The selection switching element 25B of the piezo-stack 127B of the #2 cylinder is turned on. Because both piezo-stacks 127A and 127B are conductive through the fork-branch section of the current supply cable 203E, the current flows through the piezo-stack 127A of the #1 cylinder, the current supply cable 203E, the piezo-stack 127B of the #2 cylinder, the current supply cable 203B, the selection switching element 25B of the #2 cylinder, the selection parasitic diode 251A of the #1 cylinder, and the current supply cable 203A.

Thereby, the charge moves from the piezo-stack 127A of the #1 cylinder to the piezo-stack 127B of the #2 cylinder. The piezo-stack voltage of the #1 cylinder falls down below the valve opening voltage Vopen, and the valve of the injector 1 of the #1 cylinder is closed. Though the voltage V2 between both ends of the piezo-stack 127B of the #2 cylinder rises, the voltage V2 will not exceed the valve opening voltage Vopen because the charge is divided by both piezo-stacks 127A and 127B.

As described above, the injector 1 of the piezo-stacks 127A to 127D that are disabled to discharge stops fuel injection quickly.

(Second Embodiment)

Figure 9:
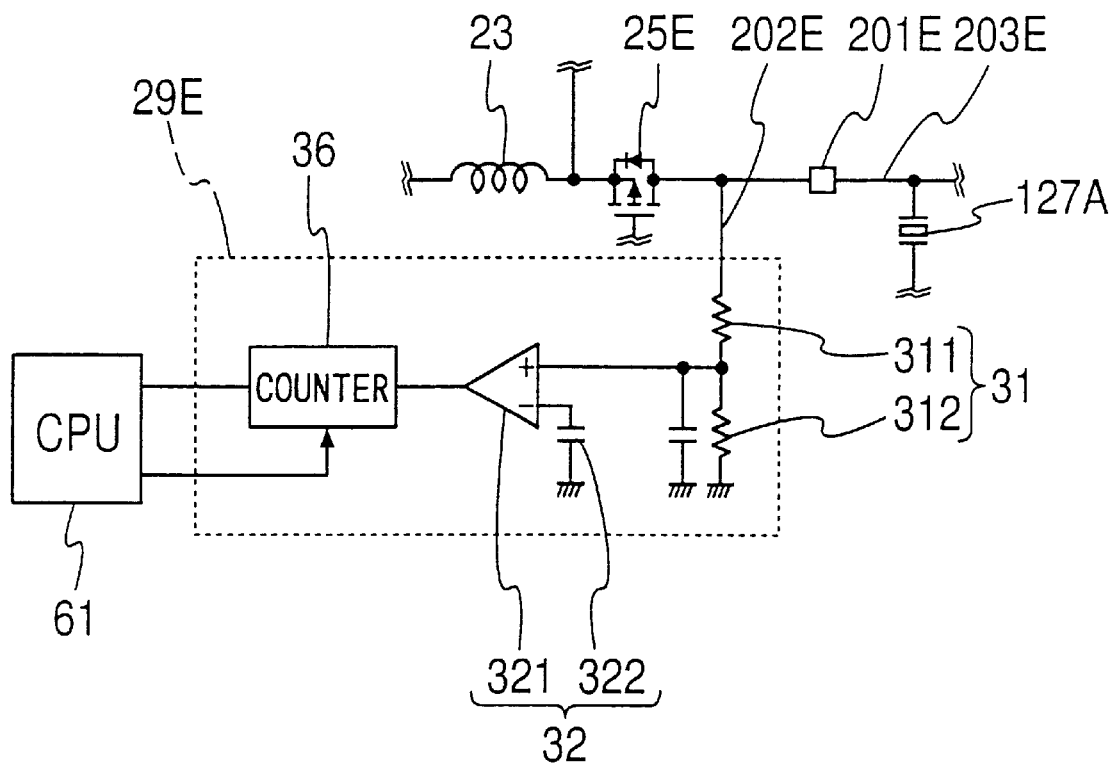
FIG. 9 is a circuit diagram showing an abnormality detection circuit of the piezoelectric actuator drive circuit according to a second embodiment of the present invention.

In this embodiment, the abnormality detection circuits 29E and 29F of the first embodiment are modified as shown in FIG. 9.

The abnormality detection circuit section 29E for the #1 and #2 cylinders is provided with a counter 36 that serves as a counting means. The counter 36 receives the output of the comparator 321 that constitutes the comparison means 32, and counts the number of supplied pulses. The counter 36 is reset, for example, at the rising timing of the injection signal. The CPU 31 monitors the count value of the counter 36, for example, at the falling down timing of the injection signal, and determines whether the conduction abnormality occurs on the current supply cables 203A to 203F during charge holding state of the piezo-stack or not depending on the number of counts.

That is, if the count value is "0", it means that the common terminal voltage Vcom never falls down below the reference voltage Vref during the output period of the injection signal, and the injection is determined to be normal (FIG. 5). If the count value is "1", it means that the common terminal voltage Vcom falls down below the reference voltage once during the output period of the injection signal (FIG. 6). If the count value is "2 or higher", it means that the common terminal voltage Vcom falls down and rises up several times across the reference voltage Vref, and jittering is determined (FIG. 7).

The abnormality detection circuit section for the #3 and #4 cylinders has the same structure though not shown in the drawing, and operates similarly.

The above embodiments may be modified in various other ways. For instance, the injector may be of the type in which a single piston pushed by a piezo-stack pushes a ball directly without the displacement enlarging chamber. Furthermore, the piezoelectric actuator drive circuit may be applied for driving a piezoelectric actuator that is used for other applications.

What is claimed is:

1. A piezoelectric actuator drive circuit comprising:
   a charge/discharge circuit section for charging and discharging a piezo-stack mounted on a piezoelectric actuator;
   a pair of positive and negative connection terminals connected to a current supply cable that extends to the piezo-stack; and
   an abnormality detection circuit section for detecting a conduction abnormality of the current supply cable,
   wherein the abnormality detection circuit section includes:
   a voltage detection means for detecting a voltage at a non-ground side connection terminal out of the connection terminals; and
   a comparison means for comparing a detected voltage with a reference voltage for supplying a comparison signal.

2. The piezoelectric actuator drive circuit according to claim 1, wherein the abnormality detection circuit section includes a counting means for counting a number of times when the detected voltage exceeds the reference voltage between a charge command and a discharge command of the piezo-stack.

3. The piezoelectric actuator drive circuit according to claim 2, wherein a binary counter that is capable of two-bit counting is employed as the counting means comprising a two-step D flip-flop circuits which are reset corresponding to the charge command.

4. The piezoelectric actuator drive circuit according to claim 3, wherein:
   the comparison means has a structure for generating a first comparison signal that rises when the detected voltage exceeds the reference voltage and a second comparison signal having a phase inverse to the first comparison signal that rises up when the detected voltage falls down below the reference voltage;
   the abnormality detection circuit section further includes an S-R flip-flop circuit having a set terminal which receives the first comparison signal as an input and having a reset terminal which receives the second comparison signal as an input;
   an input value fixing means for fixing the input value of the set terminal or the reset terminal forcedly; and
   the output signal of the S-R flip-flop circuit is supplied to the binary counter as the input signal.

5. The piezoelectric actuator drive circuit according to claim 4, wherein the set input value fixing means that fixes the input value of the set terminal of the S-R flip-flop circuit to "L" when the output of the binary counter changes to "H" is provided as the input value fixing means.

6. The piezoelectric actuator drive circuit according to claim 4, wherein the input value fixing means includes a reset input value fixing means that fixes the input value of the reset terminal of the S-R flip-flop circuit to "L" when the discharge command is supplied as the input.

7. A fuel injection system comprising:
   an injector that switches between injecting and stopping of fuel by opening or shutting a nozzle by means of the piezoelectric actuator; and
   a piezoelectric actuator drive circuit for driving the piezoelectric actuator according to claim 1.

* * * * *